(12) United States Patent
Jiang et al.

(10) Patent No.: US 12,048,264 B1
(45) Date of Patent: Jul. 30, 2024

(54) ANABASIS APHYLLA FIELD PLANTING DEVICE AND PLANTING METHOD THEREOF

(71) Applicant: SHIHEZI UNIVERSITY, Shihezi (CN)

(72) Inventors: Ping Jiang, Shihezi (CN); Jianbing Ge, Shihezi (CN)

(73) Assignee: SHIHEZI UNIVERSITY, Shihezi (CN)

( * ) Notice: Subject to any disclaimer, the term of this patent is extended or adjusted under 35 U.S.C. 154(b) by 0 days.

(21) Appl. No.: 18/614,547

(22) Filed: Mar. 22, 2024

Related U.S. Application Data

(63) Continuation of application No. PCT/CN2023/074319, filed on Feb. 3, 2023.

(30) Foreign Application Priority Data

Sep. 1, 2022 (CN) .......................... 202211067722.X

(51) Int. Cl.
| | | |
|---|---|---|
| *A01D 11/02* | (2006.01) | |
| *A01C 11/00* | (2006.01) | |
| *A01C 11/02* | (2006.01) | |
| *A01D 11/00* | (2006.01) | |

(52) U.S. Cl.
CPC ............ *A01C 11/02* (2013.01); *A01C 11/006* (2013.01)

(58) Field of Classification Search
CPC .............................. A01D 11/02; A01D 11/006
See application file for complete search history.

(56) References Cited

U.S. PATENT DOCUMENTS

| | | |
|---|---|---|
| 4,481,893 A | 11/1984 | Qvarnström |
| 10,188,028 B2 | 1/2019 | Mihara |

FOREIGN PATENT DOCUMENTS

| | | | | |
|---|---|---|---|---|
| CN | 108076757 A | * | 5/2018 | ............ A01C 11/006 |
| CN | 108738560 A | * | 11/2018 | ............. A01C 11/02 |
| CN | 109392389 A | * | 3/2019 | ............. A01C 11/02 |
| CN | 113207375 X | | 8/2021 | |
| EP | 4169365 Y | | 4/2023 | |
| FR | 691713 A1 | * | 10/1930 | |
| FR | 2474271 Y | | 7/1981 | |
| JP | 6294568 Y | | 3/2018 | |
| KR | 20090106019 A | * | 10/2009 | |

* cited by examiner

*Primary Examiner* — Alicia M Torres

(57) ABSTRACT

An *Anabasis aphylla* field planting device includes a frame body of a mobile machine, a planting frame and a sprinkling irrigation system. A top of the planting frame is arranged with a seedling clamping and conveying mechanism; the seedling clamping and conveying mechanism includes a conveying rod shaft, a rotary supporting and feeding piece, an autorotative driving ring piece, a clamping piece and a driving piece; and the clamping piece includes a fixed supporting rod and a U-shaped clamping body. The planting device is simple in structure and can automatically support and feed the planting seedlings; and after the planting seedlings are filled with soil and irrigated, the supporting and feeding mechanism is automatically separated from the planting seedlings, without manual operation and having high planting efficiency.

6 Claims, 3 Drawing Sheets

ANABASIS APHYLLA FIELD PLANTING DEVICE AND PLANTING METHOD THEREOF

CROSS-REFERENCE TO RELATED APPLICATIONS

This application is a continuation of PCT/CN2023/074319, filed Feb. 3, 2023 and claims priority of Chinese Patent Application No. 202211067722. X, filed on Sep. 1, 2022, the entire contents of which are incorporated herein by reference.

TECHNICAL FIELD

The present disclosure relates to the technical field of plant planting, and in particular to an *Anabasis aphylla* field planting device and a planting method thereof.

BACKGROUND

*Anabasis aphylla* usually has annular cracks. Branches in a present year are yellowish green, most of which emanate from the top of twigs in pairs, usually with 4-8 internodes, unbranched or with a few branches in the upper part. The internodes are smooth or have papillae. The internodes at the lower part are subterete, up to 2.5 cm long, and the internodes at the upper part are shorter and edged. *Anabasis aphylla* grows in the Gobi Desert, alluvial fan, drought slope, etc.

The conventional planting method for *Anabasis aphylla* are as follows. A bottom of *Anabasis aphylla* is placed in a planting pit, irrigated and filled with soil to complete the planting. During the irrigation and soil filling, *Anabasis aphylla* needs to be supported by planters, so it is not easy to be planted by a single person, and the hand support is easy to cause hand scratches.

SUMMARY

An object of the present disclosure is to provide an *Anabasis aphylla* field planting device and a planting method thereof to solve the problems mentioned in the background.

In order to achieve the above object, the present disclosure provides the following technical solutions.

An *Anabasis aphylla* field planting device includes a frame body of a mobile machine, a planting frame and a sprinkling irrigation system. The planting frame is fixed on the frame body of the mobile machine, and a middle part of the planting frame is arranged with a planting seedling placement part for placing planting seedlings. The planting seedling placement part includes a placement strip frame and a discharging channel; the placement strip frame is fixed on the planting frame in an inclined manner and the discharging channel is arranged on a side wall of a lower end portion of the placement strip frame; a top of the planting frame is arranged with a seedling clamping and conveying mechanism located at a side portion of the planting seedling placement part; the seedling clamping and conveying mechanism includes a conveying rod shaft, a rotary supporting and feeding piece, an autorotative driving ring piece, a clamping piece and a driving piece; the conveying rod shaft is vertically and rotatably mounted on the planting frame, the driving piece is arranged at the top of the planting frame and is used for driving the conveying rod shaft to rotate, the autorotative driving ring piece is arranged on the planting frame and takes an axis of the conveying rod shaft as a center, the rotary supporting and feeding piece is arranged on the conveying rod shaft, and a side portion of the rotary supporting and feeding piece is connected to the autorotative driving ring piece; the autorotative driving ring piece is capable of driving the autorotation of the rotary supporting and feeding piece during the rotation of the rotary supporting and feeding piece with the conveying rod shaft; the clamping piece is arranged at a bottom of the rotary supporting and feeding piece, and the clamping piece includes a fixed supporting rod and a U-shaped clamping body, an end of the fixed supporting rod being fixed on the rotary supporting and feeding piece, and the U-shaped clamping body being arranged at an end portion of the fixed supporting rod away from a supporting and feeding rod shaft; when the clamping piece rotates to an end portion of the planting seedling placement part during the rotation of the clamping piece with the rotary supporting and feeding piece, the planting seedlings located at an end portion of the placement strip frame are clamped by the U-shaped clamping body and are carried away from the discharging channel; when the clamping piece rotates to a side of the conveying rod shaft away from the planting seedling placement part, a direction of a port of the U-shaped clamping body is consistent with that of the port of the U-shaped clamping body located at the end portion of the placement strip frame at this time due to the autorotation of the rotary supporting and feeding piece; and the sprinkling irrigation system is arranged on the planting frame and is used for watering a planting area where the planting seedlings are planted.

On the basis of the above technical solution, the present disclosure also provides the following alternative technical solutions.

In an alternative solution: the rotary supporting and feeding piece is connected to the conveying rod shaft via a connecting piece, and the connecting piece elastically slides on the conveying rod shaft along an axial direction of the conveying rod shaft; a top of the rotary supporting and feeding piece has a top roller, and the planting frame is arranged with an arc-shaped protrusion; and when the rotary supporting and feeding piece rotates above a planting pit, the top roller contacts the arc-shaped protrusion, and the arc-shaped protrusion pushes the rotary supporting and feeding piece downwards.

In an alternative solution: the rotary supporting and feeding piece includes the supporting and feeding rod shaft and an autorotation gear; the supporting and feeding rod shaft is mounted on the conveying rod shaft via the connecting piece, an axis of the supporting and feeding rod shaft is parallel to that of the conveying rod shaft, and the autorotation gear is arranged on the supporting and feeding rod shaft; the autorotative driving ring piece includes an outer ring body and two sections of inner racks with the same arc; the outer ring body is fixed on the planting frame and takes the conveying rod shaft as a center, the two sections of inner racks are correspondingly arranged on an inner wall of the outer ring body, and two blank areas are left at end portions of the two sections of inner racks, one of the two blank areas corresponding to the end portion of the planting seedling placement part; and the inner racks are capable of meshing with the autorotation gear.

In an alternative solution: the connecting piece includes a supporting bracket, a supporting sleeve and a supporting spring; the supporting sleeve is slidingly sleeved on the conveying rod shaft, a lower end portion of the conveying rod shaft is arranged with a baffle plate, and the baffle plate is connected to the supporting sleeve via the supporting spring; and one end of the supporting bracket is connected to a side portion of the supporting sleeve, and the other end is used for rotatably mounting the rotary supporting and feeding piece.

In an alternative solution: the driving piece includes a power source, an output end of the power source being in transmission connection to a top of the conveying rod shaft via a transmission gear pair.

In an alternative solution: an end portion of the placement strip frame away from the discharging channel has a pushing plate sliding therein, the pushing plate is connected to an end wall of the placement strip frame via a pushing spring, and an end portion of the placement strip frame close to the discharging channel has a spacer.

In an alternative solution: the sprinkling irrigation system includes a water tank, a water pumping piece, and a spray head; the water tank is arranged on the frame body of the mobile machine and is used for storing a water source, the water pumping piece is arranged on the planting frame, and the water pumping piece is connected to the water tank via a unidirectional water inlet pipe; and the spray head is arranged at a side portion of the autorotative driving ring piece with a spout facing the planting pit, and the spray head is connected to the water pumping piece via a unidirectional water outlet pipe.

A planting method based on an *Anabasis aphylla* field planting device described above includes the following steps: (1) pre-digging a plurality of rows of planting pits in a linear arrangement; (2) arranging planting seedlings to be planted, followed by placing on a planting seedling placement part, and (3) sequentially conveying the planting seedlings on the planting seedling placement part into the planting pits, followed by irrigating through an *Anabasis aphylla* field planting device; and fixing the planting seedlings in the planting pits by filling soil.

Compared with the prior art, the present disclosure has the following beneficial effects.

1. In the present disclosure, the planting seedling placement part can allow a plurality of planting seedlings to be placed to facilitate the subsequent conveyance and avoid manual taking, thus improving the planting efficiency.

2. In the present disclosure, the rotary supporting and feeding piece auto-rotates while rotating around the conveying rod shaft, thus driving the clamping piece to support and feed the planting seedlings on the planting seedling placement part to the planting pits, ensuring that the planting seedling is in a vertical state, thus facilitating the subsequent soil-filling planting. After the planting is completed, the clamping piece is automatically separated from the planting seedling.

3. The planting device is simple in structure and can automatically support and feed the planting seedlings; and after the planting seedlings are filled with soil and irrigated, the supporting and feeding mechanism is automatically separated from the planting seedlings, without manual operation and having high planting efficiency.

Figure 1:
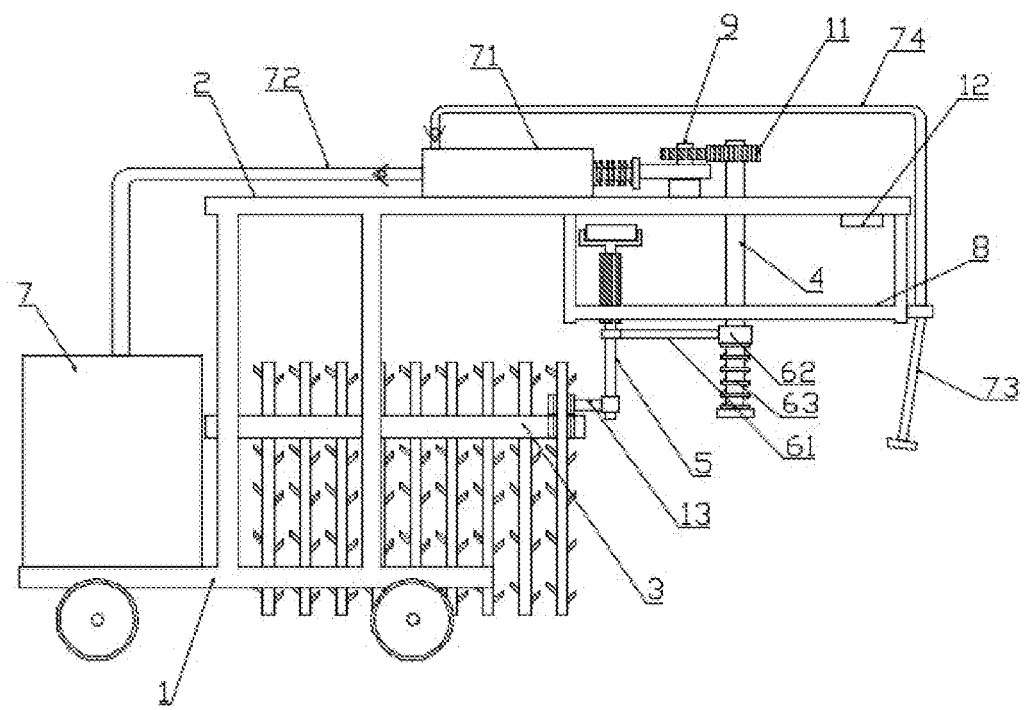
FIG. 1 is a schematic diagram of an overall structure of a device in an example of the present disclosure.

Reference numerals and denotations thereof: 1—frame body of mobile machine, 2—planting frame, 3—planting seedling placement part, 31—placement strip frame, 32—discharging channel, 33—pushing plate, 34—pushing spring, 35—spacer, 4—conveying rod shaft, 5—rotary supporting and feeding piece, 51—supporting and feeding rod shaft, 52—autorotation gear, 6—connecting piece, 61—supporting bracket, 62—supporting sleeve, 63—supporting spring, 7—water tank, 71—water pumping piece, 72—water inlet pipe, 73—spray head, 74—unidirectional water outlet pipe, 8—autorotative driving ring piece, 81—outer ring body, 82—inner rack, 9—power source, 11—transmission gear pair, 12—arc-shaped protrusion, 13—clamping piece, 131—fixed supporting rod, and 132—U-shaped clamping body.

DETAILED DESCRIPTION

In order to make the objects, technical solutions and advantages of the present disclosure clearer, the present disclosure is further explained in detail with the attached drawings and examples; and in the attached drawings or descriptions, similar or identical parts use the same reference numerals, and in practical application, the shape, thickness or height of each part can be enlarged or reduced. The examples listed in the present disclosure are only used to illustrate the present disclosure, and are not used to limit the scope of the present disclosure. Any obvious modifications or variations can be made to the present disclosure without departing from the spirit and scope of the present disclosure.

In an example, as shown in FIGS. 1-5, an *Anabasis aphylla* field planting device includes a frame body of a mobile machine 1, a planting frame 2 and a sprinkling irrigation system. The planting frame 2 is fixed on the frame body of the mobile machine 1, and a middle part of the planting frame 2 is arranged with a planting seedling placement part 3 for placing planting seedlings. The planting seedling placement part 3 includes a placement strip frame 31 and a discharging channel 32. The placement strip frame 31 is fixed on the planting frame 2 in an inclined manner and the discharging channel 32 is arranged on a side wall of a lower end portion of the placement strip frame 31. A top of the planting frame 2 is arranged with a seedling clamping and conveying mechanism located at a side portion of the planting seedling placement part 3. The seedling clamping and conveying mechanism includes a conveying rod shaft 4, a rotary supporting and feeding piece 5, an autorotative driving ring piece 8, a clamping piece 13 and a driving piece. The conveying rod shaft 4 is vertically and rotatably mounted on the planting frame 2, the driving piece is arranged at the top of the planting frame 2 and is used for driving the conveying rod shaft 4 to rotate, the autorotative driving ring piece 8 is arranged on the planting frame 2 and takes an axis of the conveying rod shaft 4 as a center, the rotary supporting and feeding piece 5 is arranged on the conveying rod shaft 4, and a side portion of the rotary supporting and feeding piece 5 is connected to the autorotative driving ring piece 8. The autorotative driving ring piece 8 is capable of driving the autorotation of the rotary supporting and feeding piece 5 during the rotation of the rotary supporting and feeding piece 5 with the conveying rod shaft 4. The clamping piece 13 is arranged at a bottom of the rotary supporting and feeding piece 5, and the clamping piece 13 includes a fixed supporting rod 131 and a U-shaped clamping body 132, an end of the fixed supporting rod 131 being fixed on the rotary supporting and feeding piece 5, and the U-shaped clamping body 132 being arranged at an end portion of the fixed supporting rod 131 away from a supporting and feeding rod shaft 51. When the clamping piece 13 rotates to an end portion of the planting seedling placement part 3 during the rotation of the clamping piece 13 with the rotary supporting and feeding piece 5, the planting seedlings located at an end portion of the placement strip frame 31 are clamped by the U-shaped clamping body 132 and are carried away from the discharging channel 32. When the clamping piece 13 rotates to a side of the conveying rod shaft 4 away from the planting seedling placement part 3, a direction of a port of the U-shaped clamping body 132 is consistent with that of the port of the U-shaped clamping body 132 located at the end portion of the placement strip frame 31 at this time due to the autorotation of the rotary supporting and feeding piece 5; and the sprinkling irrigation system is arranged on the planting frame 2 and is used for watering a planting area where the planting seedlings are planted.

In the example, the *Anabasis aphylla* planting seedlings to be planted are arranged and placed on the planting seedling placement part 3; then, the whole device is moved next to a pre-dug planting pit; and the seedling clamping and conveying mechanism is located directly above the planting pit. The conveying rod shaft 4 is driven by the driving piece to rotate, the rotary supporting and feeding piece 5 is driven by the conveying rod shaft 4 to rotate around a center of the conveying rod shaft 4, and the rotary supporting and feeding piece 5 is connected to the autorotative driving ring piece 8 so that the rotary supporting and feeding piece 5 auto-rotates while moving, and the clamping piece 13 rotates with the rotary supporting and feeding piece 5. When the clamping piece 13 rotates to the end portion of the placement strip frame 31, the planting seedlings are clamped by the U-shaped clamping body 132 and carried away from the discharging channel 32, and due to the autorotation of the rotary supporting and feeding piece 5, the carried planting seedlings rotate around a center of the rotary supporting and feeding piece 5 while rotating with the clamping piece 13 around the center of the conveying rod shaft 4. When the clamping piece 13 rotates to the other side of the conveying rod shaft 4 and is directly above the planting pit, a direction of a port of the U-shaped clamping body 132 is consistent with that of the port of the U-shaped clamping body 132 located at the end portion of the placement strip frame 31 at this time. A bottom of the planting seedling is buried into a planting pit with soil and watered through a sprinkler irrigation system. The conveying rod shaft 4 is continued to be driven by the driving piece to rotate, and the rotary supporting and feeding piece 5 and the clamping piece 13 continue to move, and since the port of the U-shaped clamping body 132 faces in the opposite direction to a moving direction of the U-shaped clamping body 132, the U-shaped clamping body 132 is separated from the planted planting seedlings. After the U-shaped clamping body 132 rotates to the end portion of the planting seedling placement part 3 again, another planting seedling can be clamped and carried away, and in this way, rapid planting can be realized; and water for planting seedling growth is used for irrigation through the sprinkler irrigation system.

Figure 2:
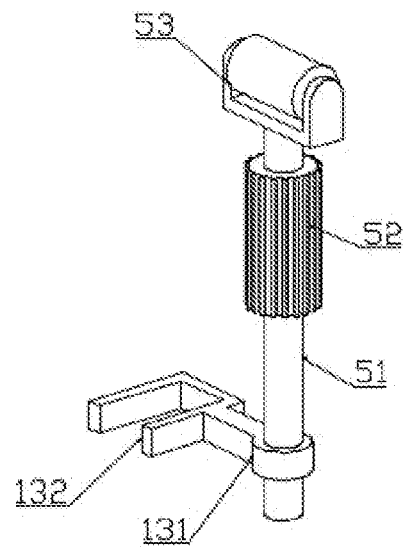
FIG. 2 is a structural schematic diagram of a rotary supporting and feeding piece and a clamping piece in an example of the present disclosure.
Figure 3:
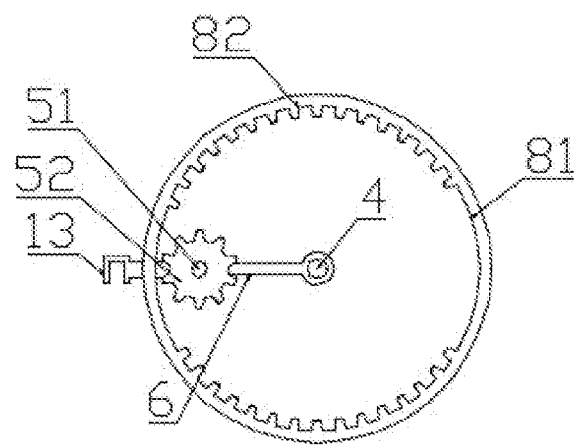
FIG. 3 is a structural schematic diagram of the clamping piece located at an end portion of a planting seedling placement part in an example of the present disclosure.
Figure 4:
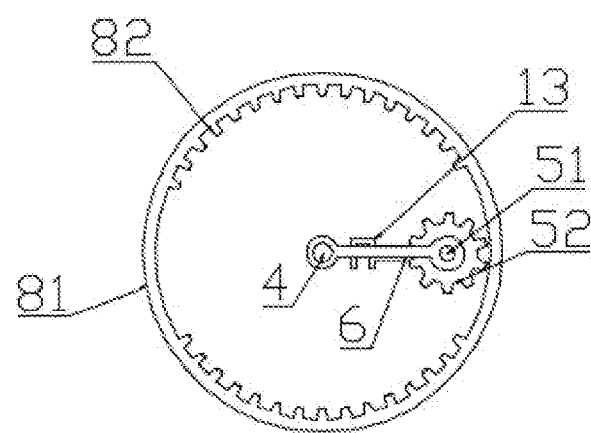
FIG. 4 is a structural schematic diagram of the clamping piece away from the planting seedling placement part in an example of the present disclosure.

In an example, as shown in FIGS. 1 and 2, the rotary supporting and feeding piece 5 is connected to the conveying rod shaft 4 via a connecting piece 6, and the connecting piece 6 elastically slides on the conveying rod shaft 4 along an axial direction of the conveying rod shaft 4; a top of the rotary supporting and feeding piece 5 has a top roller 53, and the planting frame 2 is arranged with an arc-shaped protrusion 12; and when the rotary supporting and feeding piece 5 rotates above a planting pit, the top roller 53 contacts the arc-shaped protrusion 12, and the arc-shaped protrusion 12 pushes the rotary supporting and feeding piece 5 downwards. In the example, when the planting seedling is at a front distance above the planting pit, the top roller 53 contacts the arc-shaped protrusion 12. Since the connecting piece 6 slides elastically on the conveying rod shaft 4, the arc-shaped protrusion 12 can push the rotary supporting and feeding piece 5 downwards, so that the planting seedlings can gradually move downwards and the bottoms of the planting seedlings can extend into the planting pits, thus facilitating for subsequent pit-filling and planting.

In an example, as shown in FIGS. 1-4, the rotary supporting and feeding piece 5 includes the supporting and feeding rod shaft 51 and an autorotation gear 52; the supporting and feeding rod shaft 51 is mounted on the conveying rod shaft 4 via the connecting piece 6, an axis of the supporting and feeding rod shaft 51 is parallel to that of the conveying rod shaft 4, and the autorotation gear 52 is arranged on the supporting and feeding rod shaft 51; the autorotative driving ring piece 8 includes an outer ring body 81 and two sections of inner racks 82 with the same arc; the outer ring body 81 is fixed on the planting frame 2 and takes the conveying rod shaft 4 as a center, the two sections of inner racks 82 are correspondingly arranged on an inner wall of the outer ring body 81, and two blank areas are left at end portions of the two sections of inner racks 82, one of the two blank areas corresponding to the end portion of the planting seedling placement part 3; and the inner racks 82 are capable of meshing with the autorotation gear 52. In the example, the rotary supporting and feeding piece 5 rotates with the conveying rod shaft 4, and the autorotation gear 52 is meshed with the inner racks 82, so that the rotary supporting and feeding piece 5 can auto-rotate. When the autorotation gear 52 moves to a blank area opposite to the end portion of the placement strip frame 31, the autorotation gear 52 is disengaged from the inner racks 82. After the rotary supporting and feeding piece 5 continues to rotate around the conveying rod shaft 4, the rotary supporting and feeding piece 5 does not auto-rotate, so that the planting seedlings can be carried away after being clamped by the U-shaped clamping body 132, avoiding the interference with the discharging channel 32. The rotary supporting and feeding piece 5 continues to move and the autorotation gear 52 is meshed with the inner racks 82, so that the rotary supporting and feeding piece 5 auto-rotates and the planting seedlings rotate around the center of the rotary supporting and feeding piece 5. When the planting seedling moves to a certain distance in front of the planting pit, that is, the autorotation gear 52 moves to another blank area, the autorotation gear 52 is disengaged from the inner racks 82, and at this time, the rotary supporting and feeding piece 5 auto-rotates half a circle, so that the direction of the port of the U-shaped clamping body 132 at this time is consistent with that of the port of the U-shaped clamping body 132 located at the end portion of the placement strip frame 31, thus facilitating the subsequent separation of planting seedlings.

In an example, as shown in FIG. 1, the connecting piece 6 includes a supporting bracket 61, a supporting sleeve 62 and a supporting spring 63; the supporting sleeve 62 is slidingly sleeved on the conveying rod shaft 4, a lower end portion of the conveying rod shaft 4 is arranged with a baffle plate, and the baffle plate is connected to the supporting sleeve 62 via the supporting spring 63; and one end of the supporting bracket 61 is connected to a side portion of the supporting sleeve 62, and the other end is used for rotatably mounting the rotary supporting and feeding piece 5. In the example, when the top roller 53 at the top of the rotary supporting and feeding piece 5 contacts the arc-shaped protrusion 12, the arc-shaped protrusion 12 pushes the rotary supporting and feeding piece 5 downwards, so that the supporting sleeve 62 can compress the supporting spring 63 to move downwards in an axial direction of the conveying rod shaft 4. When the arc-shaped protrusion 12 is separated from the top roller 53, under the elastic force of the supporting spring 63, the supporting sleeve 62 and the rotary supporting and feeding piece 5 are reset, thus facilitating the subsequent clamping of the planting seedlings by the clamping piece 13.

In an example, as shown in FIG. 1, the driving piece includes a power source 9, an output end of the power source 9 being in transmission connection to a top of the conveying rod shaft 4 via a transmission gear pair 11. The power source 9 is a servo-controlled motor or a hand-controlled rotating driving rod shaft.

Figure 5:
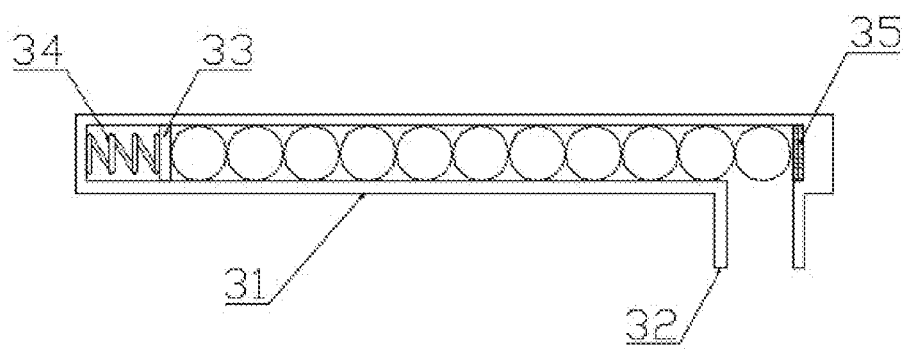
FIG. 5 is a structural schematic diagram of the planting seedling placement part in an example of the present disclosure.

In an example, as shown in FIGS. 1 and 5, an end portion of the placement strip frame 31 away from the discharging channel 32 has a pushing plate 33 sliding therein, the pushing plate 33 is connected to an end wall of the placement strip frame 31 via a pushing spring 34, and an end portion of the placement strip frame 31 close to the discharging channel 32 has a spacer 35. In the example, the pushing plate 33 can push the planting seedlings on the placement strip frame 31 to move towards the end portion of the placement strip frame 31 under the elastic force of the pushing spring 34; and the spacer 35 is arranged to prevent a side wall of the planting seedling from being scratched.

In an example, as shown in FIG. 1, the sprinkling irrigation system includes a water tank 7, a water pumping piece 71, and a spray head 73; the water tank 7 is arranged on the frame body of the mobile machine 1 and is used for storing a water source, the water pumping piece 71 is arranged on the planting frame 2, and the water pumping piece 71 is connected to the water tank 7 via a unidirectional water inlet pipe 72; and the spray head 73 is arranged at a side portion of the autorotative driving ring piece 8 with a spout facing the planting pit, and the spray head 73 is connected to the water pumping piece 71 via a unidirectional water outlet pipe 74. The water pumping piece 71 is driven by the driving piece, and water in the water tank 7 can be sucked by the water pumping piece 71 under the drive of driving piece and conveyed to the sprinkler head 73 for spraying. Since the water pumping piece 71 is controlled by the driving piece, when the planting seedlings rotate to the planting pits, the water in the water tank 7 can be sucked by the water pumping piece 71 and conveyed the spray head 73 for spraying to achieve irrigation. The water pumping piece 71 can be a telescopic cylinder body, a piston plate is arranged inside the cylinder body, and a piston rod protruding from an end wall of the water pumping piece 71 is arranged on the piston plate. By the mutual cooperation of a cam on the driving piece and a spring on the piston rod, the reciprocating movement of the piston plate inside the water pumping piece 71 can be realized, and by the cooperation with the unidirectional water inlet pipe 72 and the unidirectional water outlet pipe 74, the pumping of a water source can be realized.

The above examples provide an *Anabasis aphylla* field planting device, the conveying rod shaft 4 is driven by the driving piece to rotate, the rotary supporting and feeding piece 5 is driven by the conveying rod shaft 4 to rotate around a center of the conveying rod shaft 4, and the rotary supporting and feeding piece 5 is connected to the autorotative driving ring piece 8 so that the rotary supporting and feeding piece 5 auto-rotates while moving, and the clamping piece 13 rotates with the rotary supporting and feeding piece 5. When the clamping piece 13 rotates to the end portion of the placement strip frame 31, the planting seedlings are clamped by the U-shaped clamping body 132 and carried away from the discharging channel 32, and due to the autorotation of the rotary supporting and feeding piece 5, the carried planting seedlings rotate around a center of the rotary supporting and feeding piece 5 while rotating with the clamping piece 13 around the center of the conveying rod shaft 4. When the clamping piece 13 rotates to the other side of the conveying rod shaft 4 and is directly above the planting pit, a direction of a port of the U-shaped clamping body 132 is consistent with that of the port of the U-shaped clamping body 132 located at the end portion of the placement strip frame 31 at this time. A bottom of the planting seedling is buried into a planting pit with soil and watered through a sprinkler irrigation system. The conveying rod shaft 4 is continued to be driven by the driving piece to rotate, and the rotary supporting and feeding piece 5 and the clamping piece 13 continue to move, and since the port of the U-shaped clamping body 132 faces in the opposite direction to a moving direction of the U-shaped clamping body 132, the U-shaped clamping body 132 is separated from the planted planting seedlings. After the U-shaped clamping body 132 rotates to the end portion of the planting seedling placement part 3 again, another planting seedling can be clamped and carried away, and in this way, rapid planting can be realized; and water for planting seedling growth is used for irrigation through the sprinkler irrigation system.

The present disclosure also provides a planting method based on an *Anabasis aphylla* field planting device according to the above examples, including the following steps: (1) a plurality of rows of planting pits are pre-dug in a linear arrangement; (2) planting seedlings to be planted are arranged, followed by placing on a planting seedling placement part 3, and (3) the planting seedlings on the planting seedling placement part 3 are sequentially conveyed into the planting pits, followed by irrigating through an *Anabasis aphylla* field planting device; and the planting seedlings are fixed in the planting pits by filling soil.

The above is only the specific embodiment of the present disclosure, but the scope of protection of the present disclosure is not limited to this. Changes or substitutions easily thought of by any person familiar with the technical field within the technical scope disclosed by the present disclosure are to be included in the scope of protection of the present disclosure. Therefore, the scope of protection of the present disclosure is to be based on the scope of protection of the claims.

The invention claimed is:

1. An *Anabasis aphylla* field planting device, comprising a frame body of a mobile machine, a planting frame and a sprinkling irrigation system, wherein the planting frame is fixed on the frame body of the mobile machine, and a middle part of the planting frame is arranged with a planting seedling placement part for placing planting seedlings;

the planting seedling placement part comprises a placement strip frame and a discharging channel;

the placement strip frame is fixed on the planting frame in an inclined manner and the discharging channel is arranged on a side wall of a lower end portion of the placement strip frame;

a top of the planting frame is arranged with a seedling clamping and conveying mechanism located at a side portion of the planting seedling placement part;

the seedling clamping and conveying mechanism comprises a conveying rod shaft, a rotary supporting and feeding piece, an autorotative driving ring piece, a clamping piece and a driving piece;

the conveying rod shaft is vertically and rotatably mounted on the planting frame, the driving piece is arranged at the top of the planting frame and is used for driving the conveying rod shaft to rotate, the autorotative driving ring piece is arranged on the planting frame and takes an axis of the conveying rod shaft as a center, the rotary supporting and feeding piece is arranged on the conveying rod shaft, and a side portion of the rotary supporting and feeding piece is connected to the autorotative driving ring piece;

the autorotative driving ring piece is capable of driving an autorotation of the rotary supporting and feeding piece during the rotation of the rotary supporting and feeding piece with the conveying rod shaft;

the clamping piece is arranged at a bottom of the rotary supporting and feeding piece, and the clamping piece comprises a fixed supporting rod and a U-shaped clamping body, an end of the fixed supporting rod being fixed on the rotary supporting and feeding piece, and the U-shaped clamping body being arranged at an end portion of the fixed supporting rod away from a supporting and feeding rod shaft;

when the clamping piece rotates to an end portion of the planting seedling placement part during the rotation of the clamping piece with the rotary supporting and feeding piece, the planting seedlings located at an end portion of the placement strip frame are clamped by the U-shaped clamping body and are carried away from the discharging channel;

when the clamping piece rotates to a side of the conveying rod shaft away from the planting seedling placement part, a direction of a port of the U-shaped clamping body is consistent with that of the port of the U-shaped clamping body located at the end portion of the placement strip frame at this time due to the autorotation of the rotary supporting and feeding piece; and the sprinkling irrigation system is used for watering a planting area where the planting seedlings are planted;

the rotary supporting and feeding piece is connected to the conveying rod shaft via a connecting piece, and the connecting piece elastically slides on the conveying rod shaft along an axial direction of the conveying rod shaft;

a top of the rotary supporting and feeding piece has a top roller, and the planting frame is arranged with an arc-shaped protrusion;

when the rotary supporting and feeding piece rotates above a planting pit, the top roller contacts the arc-shaped protrusion, and the arc-shaped protrusion pushes the rotary supporting and feeding piece downwards;

the rotary supporting and feeding piece comprises the supporting and feeding rod shaft and an autorotation gear;

the supporting and feeding rod shaft is mounted on the conveying rod shaft via the connecting piece, an axis of the supporting and feeding rod shaft is parallel to that of the conveying rod shaft, and the autorotation gear is arranged on the supporting and feeding rod shaft;

the autorotative driving ring piece comprises an outer ring body and two sections of inner racks with the same arc;

the outer ring body is fixed on the planting frame and takes the conveying rod shaft as a center, the two sections of inner racks are correspondingly arranged on an inner wall of the outer ring body, and two blank areas are left at end portions of the two sections of inner racks, one of the two blank areas corresponding to the end portion of the planting seedling placement part;

the inner racks are capable of meshing with the autorotation gear;

the connecting piece comprises a supporting bracket, a supporting sleeve and a supporting spring;

the supporting sleeve is slidingly sleeved on the conveying rod shaft, a lower end portion of the conveying rod shaft is arranged with a baffle plate, and the baffle plate is connected to the supporting sleeve via the supporting spring; and one end of the supporting bracket is connected to a side portion of the supporting sleeve, and the other end is used for rotatably mounting the rotary supporting and feeding piece.

2. The *Anabasis aphylla* field planting device according to claim 1, wherein the driving piece comprises a power source, an output end of the power source being in transmission connection to a top of the conveying rod shaft via a transmission gear pair.

3. The *Anabasis aphylla* field planting device according to claim 1, wherein an end portion of the placement strip frame away from the discharging channel has a pushing plate sliding therein, the pushing plate is connected to an end wall of the placement strip frame via a pushing spring, and an end portion of the placement strip frame close to the discharging channel has a spacer.

4. The *Anabasis aphylla* field planting device according to claim 1, wherein the sprinkling irrigation system comprises a water tank, a water pumping piece, and a spray head;

the water tank is arranged on the frame body of the mobile machine and is used for storing a water source, the water pumping piece is arranged on the planting frame, and the water pumping piece is connected to the water tank via a unidirectional water inlet pipe; and the spray head is arranged at a side portion of the autorotative driving ring piece with a spout facing the planting pit, and the spray head is connected to the water pumping piece via a unidirectional water outlet pipe.

5. A planting method based on an *Anabasis aphylla* field planting device according to claim 1, comprising the following steps:

pre-digging a plurality of rows of planting pits in a linear arrangement;

arranging planting seedlings to be planted, followed by placing on a planting seedling placement part, and sequentially conveying the planting seedlings on the planting seedling placement part into the planting pits, followed by irrigating through the *Anabasis aphylla* field planting device; and fixing the planting seedlings in the planting pits by filling soil.

6. A planting method based on an *Anabasis aphylla* field planting device according to claim 4, comprising the following steps:

pre-digging a plurality of rows of planting pits in a linear arrangement;

arranging planting seedlings to be planted, followed by placing on a planting seedling placement part, and sequentially conveying the planting seedlings on the planting seedling placement part into the planting pits, followed by irrigating through the *Anabasis aphylla* field planting device; and fixing the planting seedlings in the planting pits by filling soil.

* * * * *